(12) United States Patent
Grenier et al.

(10) Patent No.: US 12,466,766 B2
(45) Date of Patent: Nov. 11, 2025

(54) LASER BONDING OF GLASS TO THIN METAL FOIL

(71) Applicant: CORNING INCORPORATED, Corning, NY (US)

(72) Inventors: Jason Roy Grenier, Horseheads, NY (US); Sasha Marjanovic, Painted Post, NY (US); Bertrand Paris, Painted Post, NY (US); Jonathan David Pesansky, Corning, NY (US); Kristopher Allen Wieland, Painted Post, NY (US); Ming Ying, San Diego, CA (US)

(73) Assignee: CORNING INCORPORATED, Corning, NY (US)

( * ) Notice: Subject to any disclaimer, the term of this patent is extended or adjusted under 35 U.S.C. 154(b) by 93 days.

(21) Appl. No.: 18/687,025

(22) PCT Filed: Aug. 26, 2022

(86) PCT No.: PCT/US2022/041671
§ 371 (c)(1),
(2) Date: Feb. 27, 2024

(87) PCT Pub. No.: WO2023/034138
PCT Pub. Date: Mar. 9, 2023

(65) Prior Publication Data
US 2025/0128986 A1    Apr. 24, 2025

Related U.S. Application Data

(60) Provisional application No. 63/274,984, filed on Nov. 3, 2021, provisional application No. 63/238,515, filed on Aug. 30, 2021.

(51) Int. Cl.
*C03C 27/02* (2006.01)
*B23K 26/0622* (2014.01)
(Continued)

(52) U.S. Cl.
CPC .......... *C03C 27/02* (2013.01); *B23K 26/0624* (2015.10); *B23K 26/324* (2013.01);
(Continued)

(58) Field of Classification Search
CPC ...................................................... C03C 27/02
See application file for complete search history.

(56) References Cited

U.S. PATENT DOCUMENTS 8,796,109 B2    8/2014  Ruben et al.
9,171,721 B2   10/2015  Danzl et al.
(Continued)

OTHER PUBLICATIONS

MKS Spectra-Physics® "Glass Micro-Welding With Picosecond Lasers"; 3 Pages; 2021.
(Continued)

*Primary Examiner* — Jeffry H Aftergut
(74) *Attorney, Agent, or Firm* — Svetlana Z. Short

(57) ABSTRACT

A method of laser bonding glass to metal foil includes contacting a first glass substrate with a first metal foil to create a first contact location; directing a laser beam on the first contact location to bond the first glass substrate to the first metal foil; contacting a second glass substrate with a second metal foil to create a second contact location; and directing the laser beam on the second contact location to bond the second glass substrate to the second metal foil, wherein the first metal foil and the second metal foil each have a thickness from 5 μm to 100 μm, and wherein the laser beam comprises a pulsed laser comprising: a pulse energy from 2.8 μJ to 1000 μJ; and a wavelength such that the first and second glass substrates are substantially transparent to the wavelength.

18 Claims, 6 Drawing Sheets

(51) Int. Cl.
*B23K 26/324* (2014.01)
*B23K 26/57* (2014.01)
*B23K 26/06* (2014.01)
*B23K 103/00* (2006.01)

(52) U.S. Cl.
CPC .......... *B23K 26/57* (2015.10); *B23K 26/0648* (2013.01); *B23K 2103/54* (2018.08)

(56) References Cited

U.S. PATENT DOCUMENTS

| | | |
|---|---|---|
| 9,492,990 B2 | 11/2016 | Karam et al. |
| 10,124,559 B2 | 11/2018 | Sandlin et al. |
| 10,297,787 B2 | 5/2019 | Dejneka et al. |
| 2023/0073656 A1 | 3/2023 | Lepicard et al. |
| 2024/0058895 A1* | 2/2024 | Paris .................... B23K 26/206 |

OTHER PUBLICATIONS

MKS Spectra-Physics® "Very High-Quality Cutting of Thin Glass and Sapphire With the Icefyre® Picosecond Laser"; 3 Pages; 2021.
Spectra-Physics® "High Quality, High Throughput Glass Processing With the Icefyre® 1064-50 Picosecond Laser"; 4 Pages; 2018.
Spectra-Physics® "Micromachining Transparent, Brittle Materials With Icefyre™ Picosecond Laser"; 2 Pages, 2017.

* cited by examiner

LASER BONDING OF GLASS TO THIN METAL FOIL

CROSS-REFERENCE TO RELATED APPLICATIONS

This application claims the benefit of priority under 35 U.S.C. § 371 of International Application No. PCT/US2022/041671, filed on Aug. 26, 2022, which claims the benefit of priority under 35 U.S.C. § 119 of U.S. Provisional Application No. 63/238,515 filed Aug. 30, 2021, and U.S. Provisional Application No. 63/274,984 filed Nov. 3, 2021, the content of each of which is incorporated herein by reference in its entirety.

BACKGROUND

Field

The present specification generally relates to glass bonded to metal foil and, in particular, to laser bonding of glass to thin metal foil.

Technical Background

Hermetically bonded glass and metal foil packages are increasingly popular for application to electronics and other devices that may benefit from a hermetic environment for sustained operation. However, conventional laser bonding processes may result in undesirable thermal related defects in regions proximate the bond.

Accordingly, a need exists for an alternative method to produce laser bonded glass and metal foil packages while minimizing the thermal defects in regions proximate the bond.

SUMMARY

According to a first aspect A1, a method of laser bonding glass to metal foil may comprise: positioning a first surface of a first glass substrate adjacent to a first surface of a second glass substrate; contacting a second surface of the first glass substrate with a first surface of a first metal foil to create a first contact location between at least a portion of the second surface of the first glass substrate and the first surface of the first metal foil; conducting a first welding step by directing a laser beam on at least a portion of the first contact location to bond the first glass substrate to the first metal foil and form a first bond location; contacting a second surface of the second glass substrate with a first surface of a second metal foil to create a second contact location between at least a portion of the second surface of the second glass substrate and the first surface of the second metal foil; and conducting a second welding step by directing the laser beam on at least a portion of the second contact location to bond the second glass substrate to the second metal foil and form a second bond location, wherein the first metal foil and the second metal foil each have a thickness greater than or equal to 5 µm and less than or equal to 100 µm, and wherein the laser beam comprises a pulsed laser comprising: a pulse energy greater than or equal to 2.8 µJ and less than or equal to 1000 µJ; and a wavelength such that the first glass substrate and the second glass substrate are substantially transparent to the wavelength of the laser beam and the first metal foil and the second metal foil are substantially opaque to the wavelength of the laser beam.

A second aspect A2 includes the method according to the first aspect A1, wherein at least one of the first bond location and the second bond location have a maximum bond depth less than or equal to 20 µm.

A third aspect A3 includes the method according to the first aspect A1 or the second aspect A2, wherein the first metal foil and the second metal foil are sealed to produce a hermetically sealed package.

A fourth aspect A4 includes the method according to any one of the first through third aspects A1-A3, wherein the pulsed laser has a wavelength greater than or equal 300 nm and less than or equal to 1100 nm.

A fifth aspect A5 includes the method according to any one of the first through fourth aspects A1-A4, wherein the pulsed laser is a nanosecond pulsed laser, a picosecond pulsed laser, or a femtosecond pulsed laser.

A sixth aspect A6 includes the method according to any one of the first through fifth aspects A1-A5, wherein the pulsed laser has a repetition rate greater than or equal to 5 kHz and less than or equal to 1 MHz.

A seventh aspect A7 includes the method according to any one of the first through sixth aspects A1-A6, wherein the pulsed laser has a spot size greater than or equal to 5 µm and less than or equal to 50 µm.

An eighth aspect A8 includes the method according to any one of the first through seventh aspects A1-A7, wherein the laser beam is directed at an oblique angle of incidence relative to the first glass substrate and the second glass substrate.

A ninth aspect A9 includes the method according to the eighth aspect A8, wherein the oblique angle of incidence is less than or equal to 30°.

A tenth aspect A10 includes the method according to the eighth aspect A8 or the ninth aspect A9, wherein a lens is disposed optically upstream of both the first and second glass substrates such that the laser beam passes through the lens before passing through the first glass substrate and the second glass substrate.

An eleventh aspect A11 includes the method according to any one of the first through tenth aspects A1-A10, wherein during the first welding step, the first glass substrate is disposed optically downstream of the second glass substrate such that the laser beam passes through the second glass substrate, then the first glass substrate, before arriving at the first contact location.

A twelfth aspect A12, includes the method according to any one of the first through eleventh aspects A1-A11, wherein during the second welding step, the second glass substrate is disposed optically downstream of the first glass substrate such that the laser beam passes through the first glass substrate, then the second glass substrate, before arriving at the second contact location.

A thirteenth aspect A13 includes the method according to any one of the first through seventh aspects A1-A7, wherein during the first welding step, the first metal foil is disposed optically upstream of the first glass substrate such that the laser beam contacts the first metal foil to bond the first metal foil to the first glass substrate.

A fourteenth aspect A14 include the method according to the thirteenth aspect A13, wherein the laser beam remove a portion of the first metal foil prior to bonding the first metal foil to the first glass substrate.

A fifteenth aspect A15 includes the method according to any one of the first through fourteenth aspects A1-A14, wherein the first glass substrate and the second glass substrate comprise a refractive index greater than or equal to 1.5 and less than or equal to 2.4.

A sixteenth aspect A16 includes the method according to any one of the first through fifteenth aspects A1-A15, wherein the first glass substrate and the second glass substrate comprise a glass, a glass-ceramic, or a ceramic comprising borate glass, silicoborate glass, phosphate-based glass, silicon carbide glass, soda-lime silicate glass, aluminosilicate glass, alkali-aluminosilicate glass, borosilicate glass, alkali-borosilicate glass, aluminoborosilicate glass, alkali-alumino-borosilicate glass, alkali-aluminosilicate glass, or sapphire.

A seventeenth aspect A17 includes the method according to any one of the first through sixteenth aspects A1-A16, wherein at least one of the first metal foil and the second metal foil comprises aluminum, aluminium alloys, stainless steel, nickel, nickel alloys, silver, silver alloys, titanium, titanium alloys, tungsten, tungsten alloys, gold, gold alloys, copper, copper alloys, bronze, iron, or a combination thereof.

An eighteenth aspect A18 includes the method according to any one of the first through seventeenth aspects A1-A17, wherein at least one of the first metal foil and the second metal foil comprises a melting point less than or equal to 1600° C.

Additional features and advantages of the laser bonding methods described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
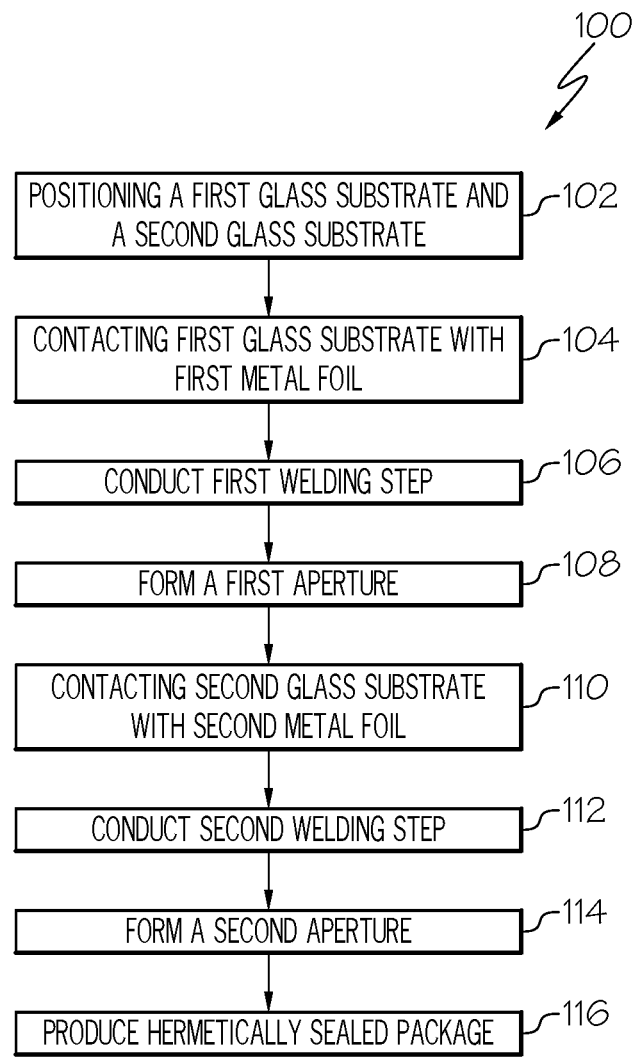
FIG. 1 is a flow diagram of a method of laser bonding glass to metal foil, according to one or more embodiments shown and described herein.

Reference will now be made in detail to various embodiments of methods of laser bonding glass to metal foil while minimizing related thermal defects in regions proximate the bond. According to embodiments, a method of laser bonding glass to metal foil includes positioning a first surface of a first glass substrate adjacent to a first surface of a second glass substrate; contacting a second surface of the first glass substrate with a first surface of a first metal foil to create a first contact location between at least a portion of the second surface of the first glass substrate and the first surface of the first metal foil; conducting a first welding step by directing a laser beam on at least a portion of the first contact location to bond the first glass substrate to the first metal foil and form a first bond location; contacting a second surface of the second glass substrate with a first surface of a second metal foil to create a second contact location between at least a portion of the second surface of the second glass substrate and the first surface of the second metal foil; and conducting a second welding step by directing the laser beam on at least a portion of the second contact location to bond the second glass substrate to the second metal foil and form a second bond location. The first metal foil and the second metal foil each have a thickness greater than or equal to 5 μm and less than or equal to 100 μm. The laser beam comprises a pulsed laser having a pulse energy greater than or equal to 2.8 μJ and less than or equal to 1000 μJ; and a wavelength such that the first glass substrate and the second glass substrate are substantially transparent to the wavelength of the laser beam and the first metal foil and the second metal foil are substantially opaque to the wavelength of the laser beam. Various embodiments of laser bonding glass to metal foil and the packages formed therefrom will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

"Hermetically bonded" or "hermetically sealed," as described herein, refers to a package that includes a hermetic seal in accordance with MIL-STD-750E, Test Method 1071.9.

Figure 4:
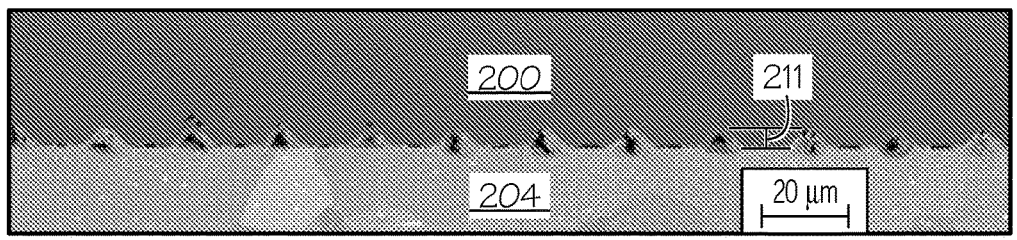
FIG. 4 is a scanning electron microscope image of metal foil bonded to glass, according to one or more embodiments shown and described herein.

"Maximum bond depth," as described herein and determined using scanning electron microscopy, refers to a depth in the thickness direction of the glass substrate/metal foil interface, which may lie partially within the glass substrate and partially within the metal foil as shown in FIG. 4.

Hermetically bonded glass and metal foil packages may be used in devices which benefit from hermetic packaging, such as televisions, sensors, optical devices, organic light emitting diode (OLED) displays, 3D inkjet printers, solid-state lighting sources, batteries, and photo-voltaic structures. Conventional laser bonding processes involve utilizing high energy lasers to bond thick metal foil (e.g., foil with a thickness greater than 50 μm) to glass. However, heating with a high energy laser may result in related thermal defects (e.g., cracking) in regions proximate the bond.

Disclosed herein are methods of laser bonding glass to metal foil which mitigate the aforementioned problems such that related thermal defects in regions proximate the bond are minimized. Specifically, the methods of laser bonding glass to metal foil disclosed herein utilize lower energy lasers to bond thin metal foil (e.g., foil with a thickness greater than or equal to 5 μm and less than or equal to 50 μm) to glass to produce hermitically bonded packages having a reduced maximum bond depth (e.g., a bond depth less than or equal to 20 μm or less than or equal to 10 μm).

Figure 2:
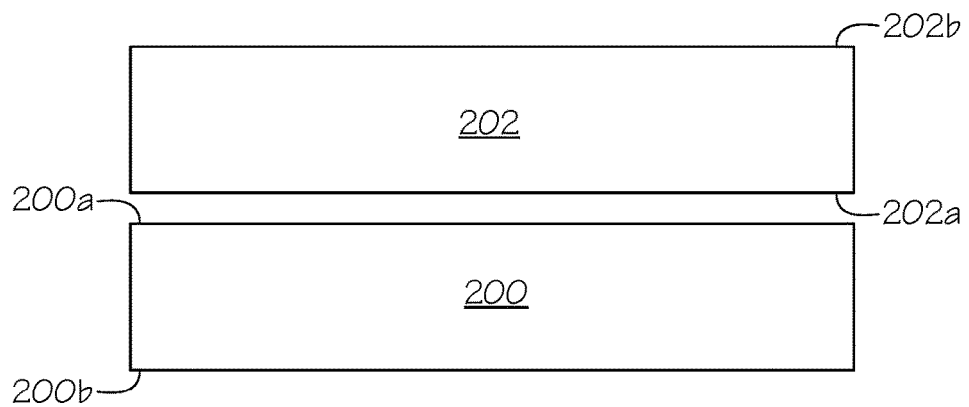
FIG. 2 schematically depicts a step of the laser bonding method, according to one or more embodiments shown and described herein.

Referring now to FIGS. 1 and 2, a method of laser bonding glass to metal foil 100 begins at block 102 with positioning a first glass substrate 200 and a second glass substrate 202. Each of the first glass substrate 200 and the second glass substrate 202 have a first surface 200a, 202a and a second surface 200b, 202b opposite the first surface 200a, 202a.

The first surface 200a of the first glass substrate 200 is placed adjacent to the first surface 202a of the second glass substrate 202. In embodiments, as shown, the first glass substrate 200 and the second glass substrate 202 may not be in direct contact with each other such that one or more other glass substrates or a component (e.g., an electronic component) may be placed therebetween to protect the additional substrate(s) or component from different environmental conditions, such as pressure changes, moisture, bodily fluids, or the like. In embodiments, the first glass substrate 200 and the second glass substrate 202 may be in direct contact (not shown). In embodiments, the first glass substrate 200 and the second glass substrate 202 may be a single substrate with a cavity (e.g., formed from the edge) sealed as described herein.

In embodiments, the first and second glass substrates 200, 202 may comprise a refractive index greater than or equal to 1.5 and less than or equal to 2.4. In embodiments, the first and second glass substrates 200, 202 may comprise a refractive index greater than or equal to 1.5, greater than or equal to 1.6, greater than or equal to 1.7, greater than or equal to 1.8, or even greater than or equal to 1.9. In embodiments, the first and second glass substrates 200, 202 may comprise a refractive index less than or equal to 2.4, less than or equal to 2.3, or even less than or equal to 2.2. In embodiments, the first and second glass substrates 200, 202 may comprise a refractive index greater than or equal to 1.5 and less than or equal to 2.4, greater than or equal to 1.5 and less than or equal to 2.3, greater than or equal to 1.5 and less than or equal to 2.2, greater than or equal to 1.6 and less than or equal to 2.4, greater than or equal to 1.6 and less than or equal to 2.3, greater than or equal to 1.6 and less than or equal to 2.2, greater than or equal to 1.7 and less than or equal to 2.4, greater than or equal to 1.7 and less than or equal to 2.3, greater than or equal to 1.7 and less than or equal to 2.2, greater than or equal to 1.8 and less than or equal to 2.4, greater than or equal to 1.8 and less than or equal to 2.3, greater than or equal to 1.8 and less than or equal to 2.2, greater than or equal to 1.9 and less than or equal to 2.4, greater than or equal to 1.9 and less than or equal to 2.3, or even greater than or equal to 1.9 and less than or equal to 2.2, or any and all sub-ranges formed from any of these endpoints.

In embodiments, the first and second glass substrates 200, 202 may comprise a glass or a glass-ceramic. In some embodiments, the first and/or second glass substrates 200, 202 may be fully or substantially fully cerammed, such that they comprise a ceramic material. By way of non-limiting examples, the first and second glass substrates 200, 202 may comprise borate glass, silicoborate glass, phosphate-based glass, silicon carbide glass, soda-lime silicate glass, aluminosilicate glass, alkali-aluminosilicate glass, borosilicate glass, alkali-borosilicate glass, aluminoborosilicate glass, alkali-alumino-borosilicate glass, alkali-aluminosilicate glass, or sapphire. In embodiments in which a relatively high refractive index glass (e.g., refractive index greater than or equal to 1.5 and less than or equal to 2.4) is desired, the first and second glass substrates 200, 202 may comprise borate glass, or silicoborate glass, such as the glass described in U.S. Provisional Application Ser. No. 63/228,704, which is incorporated by reference herein in its entirety. In embodiments, the first and second glass substrates 200, 202 may be chemically strengthened, chemically tempered, and/or thermally tempered. Non-limiting examples of suitable commercially available glass substrates include EAGLE XG®, Lotus™, Willow®, and Gorilla® glasses from Corning Incorporated, including chemically strengthened, chemically tempered, and/or thermally tempered versions thereof. In embodiments, glasses and glass-ceramics that have been chemically strengthened by ion exchange may be suitable as substrates. In other embodiments, the first and/or second glass substrates 200, 202 may be a strengthened glass-to-glass laminate.

In embodiments, the first and second glass substrates 200, 202 may comprise a coating thereon (not shown). In embodiments, the coating may comprise a similar refractive index as the first and second glass substrates 200, 202. In embodiments, the coating may comprise a polymer coating, an antireflection (AR) coating, an oliphobic coating, an antiglare coating, or a scratch resistant coating.

In embodiments, the first and second glass substrates 200, 202 may be formed from a material that is substantially transparent to a selected wavelength of a laser beam. The term "substantially transparent" means that a wavelength of a laser beam transmits through the material without being substantially absorbed or scattered. For example, in embodiments, a material that is substantially transparent to a wavelength of a laser beam may be a material that exhibits a transmittance greater or equal to 90% at the wavelength. In embodiments, the first and second glass substrates 200, 202 may be substantially transparent to a wavelength of light greater than or equal to 300 nm and less than or equal to 1100 nm or even greater than or equal to 330 nm and less than or equal to 750 nm.

In embodiments, the first and second glass substrates 200, 202 may be subjected to surface preparation prior to bonding of the glass substrates to a metal foil. For example, in embodiments, the first and second glass substrates 200, 202 may be polished until the surfaces thereof exhibit comparatively lower surface roughness values, which may enhance bonding. In embodiments, the first surface and/or the second surface 200a, 200b, 202a, 202b of the first and second glass substrates 200, 202 may be polished until the first surface and/or second surface 200a, 200b, 202a, 202b exhibit an average surface roughness (Ra) less than or equal to 1 µm, less than or equal to 0.5 µm, or even less than or equal to 0.25 µm. The smooth surface may allow the first and second glass substrates to be placed in close contact with a metal foil (e.g., within a few µm of one another). In addition, the first and second glass substrates 200, 202 may be cleaned with water and/or solvents to remove any debris present on the surface and/or to remove any material (oil, grease, etc.) which may diminish the transparency of the substrates to the desired laser wavelengths. Removal of any debris may allow the first and second glass substrates to be placed in close contact with a metal foil to better facilitate laser bonding of the metal foil to the glass.

Figure 3:
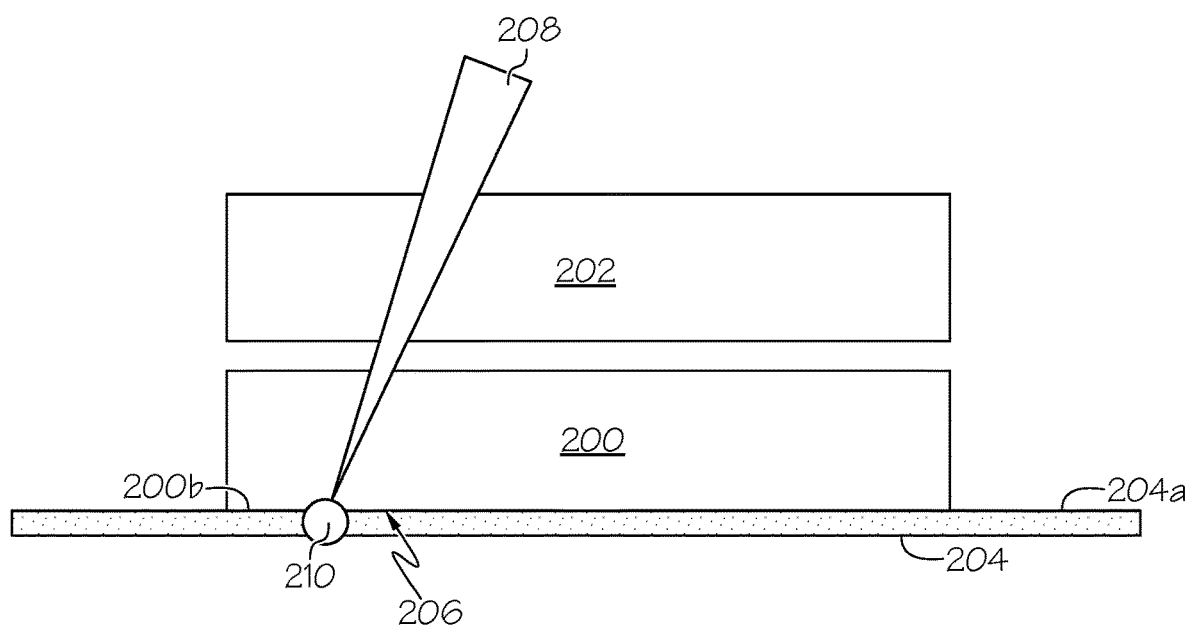
FIG. 3 schematically depicts another step of the laser bonding method, according to one or more embodiments shown and described herein.

Referring back to FIG. 1 and as shown in FIG. 3, at block 104, the second surface 200b of the first glass substrate 200 is contacted with a first surface 204a of a first metal foil 204 to create a first contact location 206 between at least a portion of the second surface 200b of the first glass substrate 200 and the first surface 204a of the first metal foil 204.

In embodiments, the first metal foil 204 may have a thickness less than or equal to 100 µm. In embodiments, the first metal foil 204 may have a thickness greater than or equal to 5 µm and less than or equal to 100 µm. In embodiments, the first metal foil 204 may have a thickness greater than or equal to 5 µm, greater than or equal to 10 µm, or even greater than or equal to 20 µm. In embodiments, the first metal foil 204 may have a thickness less than or equal to 100 µm, less than or equal to 90 µm, less than or equal to 80 µm, less than or equal to 70 µm, less than or equal to 60 µm, less than or equal to 50 µm, less than or equal to 40 µm, or even less than or equal to 30 µm. In embodiments, the first metal foil 204 may have a thickness greater than or equal to 5 µm and less than or equal to 100 µm, greater than or equal to 5 µm and less than or equal to 50 µm, greater than or equal to 5 µm and less than or equal to 40 µm, greater than or equal to 5 µm and less than or equal to 30 µm, greater than or equal to 10 µm and less than or equal to 100 µm, greater than or equal to 10 µm and less than or equal to 50 µm, greater than or equal to 10 µm and less than or equal to 40 µm, greater than or equal to 10 µm and less than or equal to 30 µm, greater than or equal to 20 µm and less than or equal to 100 µm, greater than or equal to 20 µm and less than or equal to 50 µm, greater than or equal to 20 µm and less than or equal to 40 µm, or even greater than or equal to 20 µm and less than or equal to 30 µm, or any and all sub-ranges formed from any of these endpoints.

In embodiments, the first metal foil 204 may comprise aluminum, aluminum alloys, stainless steel, nickel, nickel alloys, silver, silver alloys, titanium, titanium alloys, tungsten, tungsten alloys, gold, gold alloys, copper, copper alloys, bronze, iron, or a combination thereof. In embodiments, the first metal foil 204 may comprise a metal in combination with another non-metal material.

In embodiments, the first metal foil 204 may be formed from a material that has a melting point that allows for successful bonding to the glass substrate. In embodiments, the first metal foil 204 may comprise a melting point less than or equal to 1600° C., less than or equal to 1500° C., and less than or equal to 1400° C.

In embodiments, the first metal foil 204 may be formed from a material that is chemically compatible (i.e., bond readily) to the glass substrate. For example, a glass substrate including aluminum may more readily bond to an aluminum metal foil.

In embodiments, the first metal foil 204 may be formed from a material that is substantially opaque to a selected wavelength of a laser beam. The term "substantially opaque" means that the wavelength of the laser beam is substantially absorbed when the laser beam contacts the material. For example, in embodiments, a material that is substantially opaque to a wavelength of a laser beam may be a material that exhibits an absorbance greater than or equal to 35% at the wavelength.

In embodiments, the first metal foil 204 may have a similar average surface roughness (Ra) as the first glass substrate 200 to similarly allow the first glass substrate 200 to be placed in close contact with the metal foil 204.

Referring back to FIG. 1 and as shown in FIG. 3, at block 106, a first welding step is conducted by directing a laser beam 208 on at least a portion of the first contact location 206 to bond the first glass substrate 200 and the first metal foil 204.

In embodiments, the laser beam 208 comprises a pulsed laser. In embodiments, the pulsed laser may be a nanosecond pulsed laser, a picosecond pulsed laser, or a femtosecond pulsed laser.

The method of laser bonding described herein utilizes lower energy lasers to bond the metal foil to the glass, thereby minimizing related thermal defects in regions proximate. In embodiments, the pulsed laser may comprise a pulse energy greater than or equal to 2.8 µJ and less than or equal to 1000 µJ. In embodiments, the pulsed laser may comprise a pulse energy greater than or equal to 2.8 µJ, greater than or equal to 10 µJ, greater than or equal to 25 µJ, or even greater than or equal to 50 µJ. In embodiments, the pulsed laser may comprise a pulse energy of less than or equal to 1000 µJ, less than or equal to 750 µJ, less than or equal to 500 µJ, or even less than or equal to 250 µJ. In embodiments, the pulsed laser may comprise a pulse energy greater than or equal to 2.8 µJ and less than or equal to 1000 µJ, greater than or equal to 2.8 µJ and less than or equal to 750 µJ, greater than or equal to 2.8 µJ and less than or equal to 500 µJ, greater than or equal to 2.8 µJ and less than or equal to 250 µJ, greater than or equal to 10 µJ and less than or equal to 1000 µJ, greater than or equal to 10 µJ and less than or equal to 750 µJ, greater than or equal to 10 µJ and less than or equal to 500 µJ, greater than or equal to 10 µJ and less than or equal to 250 µJ, greater than or equal to 25

µJ and less than or equal to 1000 µJ, greater than or equal to 25 µJ and less than or equal to 750 µJ, greater than or equal to 25 µJ and less than or equal to 500 µJ, greater than or equal to 25 µJ and less than or equal to 250 µJ, greater than or equal to 50 µJ and less than or equal to 1000 µJ, greater than or equal to 50 µJ and less than or equal to 750 µJ, greater than or equal to 50 µJ and less than or equal to 500 µJ, or even greater than or equal to 50 µJ and less than or equal to 250 µJ, or any and all sub-ranges formed from any of these endpoints.

In embodiments, the pulsed laser may have a wavelength such that the first glass and/or second glass substrates 200, 202 are substantially transparent to the wavelength of the laser beam and the first metal foil 204 is substantially opaque to the wavelength of the laser beam. For example, in embodiments the pulsed laser may have a wavelength greater than or equal to 300 nm and less than or equal to 1100 nm. In embodiments, the pulsed laser may have a wavelength greater than or equal to 300 nm, greater than or equal to 325 nm, or even greater than or equal to 350 nm. In embodiments, the pulsed laser may have a wavelength less than or equal to 1100 nm, less than or equal to 900 nm, or even less than or equal to 700 nm. In embodiments, the pulsed laser may have a wavelength greater than or equal to 300 nm and less than or equal to 1100 nm, greater than or equal to 300 nm and less than or equal to 900 nm, greater than or equal to 300 nm and less than or equal to 700 nm, greater than or equal to 325 nm and less than or equal to 1100 nm, greater than or equal to 325 nm and less than or equal to 900 nm, greater than or equal to 325 nm and less than or equal to 700 nm, greater than or equal to 350 nm and less than or equal to 1100 nm, greater than or equal to 350 nm and less than or equal to 900 nm, or even greater than or equal to 350 nm and less than or equal to 700 nm, or any and all sub-ranges formed from any of these endpoints.

In embodiments, the pulsed laser may comprise a high-repetition pulsed UV laser operating at about 355 nm, 532 nm, 1064 nm or any other wavelength that is suitable, depending on the transmission of the glass.

In embodiments, the pulsed laser may have a repetition rate greater than or equal to 5 kHz and less than or equal to 1 MHz. In embodiments, the pulsed laser may have a repetition rate greater than or equal to 5 kHz, greater than or equal to 50 kHz, greater than or equal to 100 kHz, or even greater than or equal to 250 kHz. In embodiments, the pulsed laser may have a repetition rate less than or equal to 1 MHz, less than or equal to 750 kHz, or even less than or equal to 500 KHz. In embodiments, the pulsed laser may have a repetition rate greater than or equal to 5 kHz and less than or equal to 1 MHz, greater than or equal to 5 kHz and less than or equal to 750 kHz, greater than or equal to 5 kHz and less than or equal to 500 kHz, greater than or equal to 50 kHz and less than or equal to 1 MHz, greater than or equal to 50 kHz and less than or equal to 750 kHz, greater than or equal to 50 kHz and less than or equal to 500 kHz, greater than or equal to 100 kHz and less than or equal to 1 MHz, greater than or equal to 100 kHz and less than or equal to 750 kHz, greater than or equal to 100 kHz and less than or equal to 500 kHz, greater than or equal to 250 kHz and less than or equal to 1 MHz, greater than or equal to 250 kHz and less than or equal to 750 kHz, or even greater than or equal to 250 kHz and less than or equal to 500 kHz, or any and all sub-ranges formed from any of these endpoints.

In embodiments, the pulsed laser may have a spot size greater than or equal to 5 µm and less than or equal to 50 µm. In embodiments, the pulsed laser may have a spot size greater than or equal to 5 µm or even greater than or equal to 10 µm. In embodiments, the pulsed laser may have a spot size less than or equal to 50 µm, less than or equal to 35 µm, or even less than or equal to 20 µm. In embodiments, the pulsed laser may have a spot size greater than or equal to 5 µm and less than or equal to 50 µm, greater than or equal to 5 µm and less than or equal to 35 µm, greater than or equal to 5 µm and less than or equal to 20 µm, greater than or equal to 10 µm and less than or equal to 50 µm, greater than or equal to 10 µm and less than or equal to 35 µm, or even greater than or equal to 10 µm and less than or equal to 20 µm, or any and all sub-ranges formed from any of these endpoints.

In embodiments, as shown in FIG. 3, during the first welding step, the first glass substrate 200 is disposed optically downstream of the second glass substrate 202 such that the laser beam 208 passes through the second glass substrate 202, then the first glass substrate 200, before being incident on the first contact location 206. The laser beam 208 may be traversed along the first contact location 206 to facilitate a line bond between the glass and foil. For example, the laser beam may be traversed along the first contact location 206 (e.g., into and/or out of the page and/or transverse to the plane of the page in FIG. 3) to facilitate a line bond between the glass and foil.

As described herein, the methods of laser bonding glass to metal foil disclosed herein utilize lower energy lasers to minimize related thermal defects in regions proximate the bond by reducing maximum bond depth (i.e., reduced maximum bond depth 211 of less than or equal to 20 µm) as shown in FIG. 4. Referring back to FIG. 3, in embodiments, a first bond location 210 may have a maximum bond depth less than or equal to 20 µm, less than or equal to 10 µm, less than or equal to 8 µm, or even less than or equal to 6 µm. In some embodiments, the maximum bond depth or portion thereof lying within the glass substrate (e.g., excluding any portion of the bond lying within the metal foil) may be less than or equal to 20 µm, less than or equal to 10 µm, less than or equal to 8 µm, or even less than or equal to 6 µm.

Figure 5:
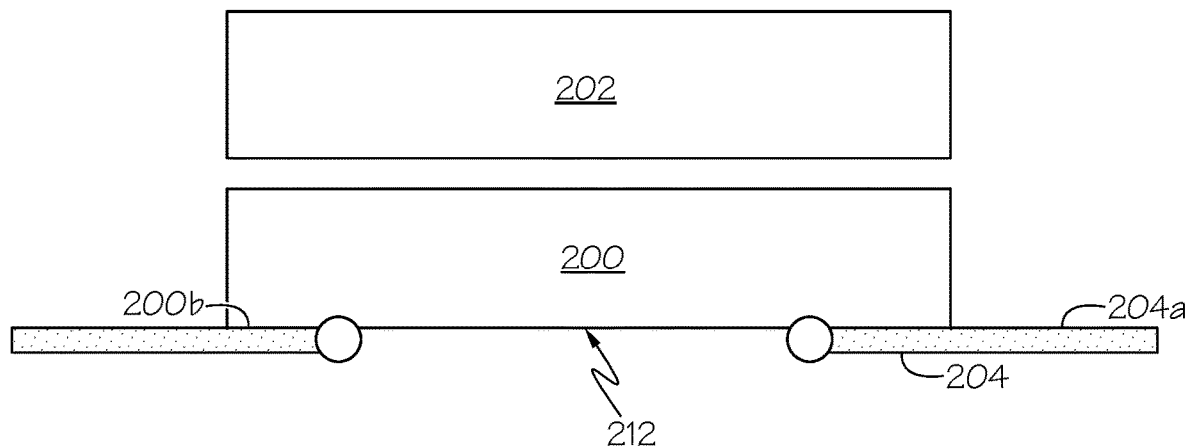
FIG. 5 schematically depicts another step of the laser bonding method, according to one or more embodiments shown and described herein.

Referring back to FIG. 1 and as shown in FIG. 5, at block 108, a portion of the first metal foil 204 may be removed from a center region of the first glass substrate 200 to form a first aperture 212 on the first glass substrate 200.

Figure 6:
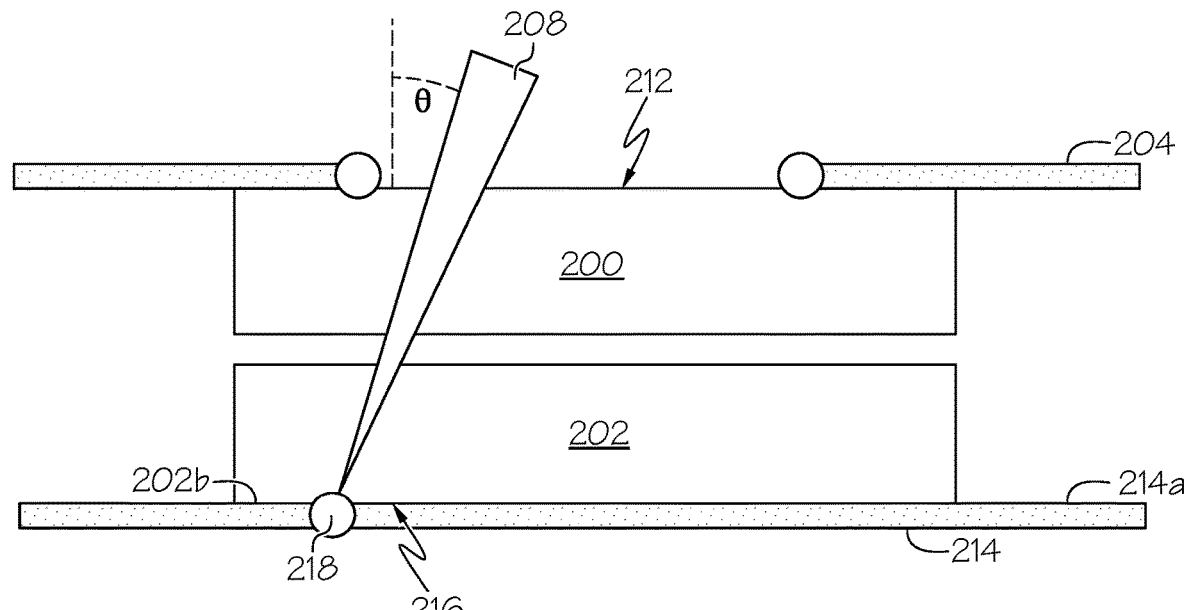
FIG. 6 schematically depicts another step of the laser bonding method, according to one or more embodiments shown and described herein.

Referring back to FIG. 1 and as shown in FIG. 6, at block 110, the second surface 202b of the second glass substrate 202 is contacted with a first surface 214a of a second metal foil 214 to create a second contact location 216 between at least a portion of the second surface 202b of the second glass substrate 202 and the first surface 214a of the second metal foil 214. In embodiments, the second metal foil 214 may have substantially similar or the same properties as the first metal foil 204 as described hereinabove with respect to FIG. 3.

Referring back to FIG. 1 and as also shown in FIG. 6, at block 112, a second welding step is conducted by directing the laser beam 208 on at least a portion of the second contact location 216 to bond the second glass substrate 202 to the second metal foil 214. In embodiments, the second welding step may utilize substantially similar or the same laser beam properties of laser beam 208 as the first welding step as described hereinabove with respect to FIG. 3. The laser beam 208 may be traversed along the second contact location 216 to facilitate a line bond between the glass and foil. For example, the laser beam may be traversed along the second contact location 216 (e.g., into and/or out of the page and/or transverse to the plane of the page in FIG. 6) to facilitate a line bond between the glass and foil.

In embodiments, as shown in FIG. 6, during the second welding step, the second glass substrate 202 may be disposed optically downstream of the first glass substrate 200 such that the laser beam 208 passes through the first glass substrate 200, then the second glass substrate 202, before being incident on the second contact location 216.

In embodiments, a second bond location 218 may have a reduced maximum bond depth substantially similar or the same as the first bond location 210 as described hereinabove with respect to FIG. 3.

As shown in FIGS. 3 and 6, the laser beam 208 may be directed at an oblique angle of incidence relative θ to the first glass substrate 200 and the second glass substrate 202 (i.e., non-normal to the surfaces of the first glass substrate and the second glass substrate 202). By directing the laser beam 208 at an oblique angle of incidence through the first aperture 212, the laser beam 208 may be incident on a contact location that may be at least partially obscured by the bonded first metal foil 204 in a direction normal to the surfaces of the glass substrates. In embodiments, the oblique angle of incidence θ may be less than or equal to 40°, less than or equal to 30°, less than or equal to 15°, or even less than or equal to 10°.

Figure 7:
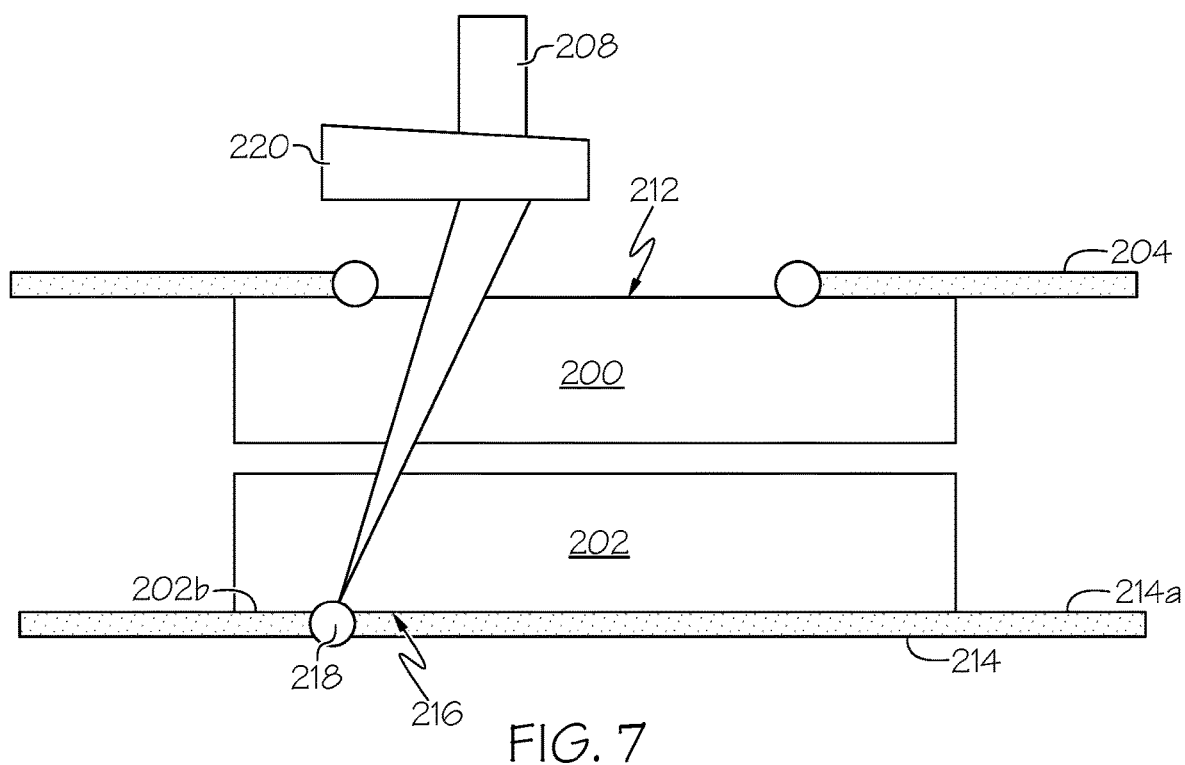
FIG. 7 schematically depicts an alternative step of the laser bonding method, according to one or more embodiments shown and described herein.

Referring now to FIG. 7, in embodiments, a lens or optical wedge 220 may be disposed optically upstream of both the first glass substrate 200 and the second glass substrate 202 such that the laser beam 208 passes through the lens or optical wedge 220 before passing through the first glass substrate 200 and the second glass substrate 202. As shown, the lens or optical wedge 220 may direct the laser beam 208 at an oblique angle of incidence relative to the first glass substrate 200 and the second glass substrate 202.

Figure 8:
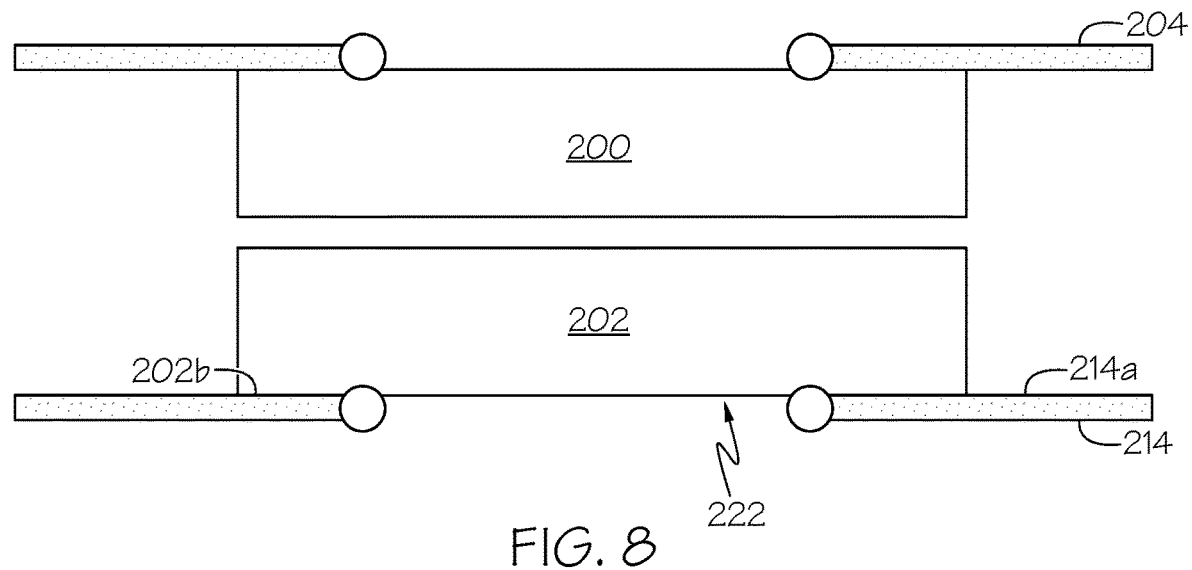
FIG. 8 schematically depicts another step of the laser bonding method, according to one or more embodiments shown and described herein.

Referring back to FIG. 1 and as shown in FIG. 8, at block 114, a portion of the second metal foil 214 may be removed from a center region of the second glass substrate 202 to form a second aperture 222.

Figure 9:
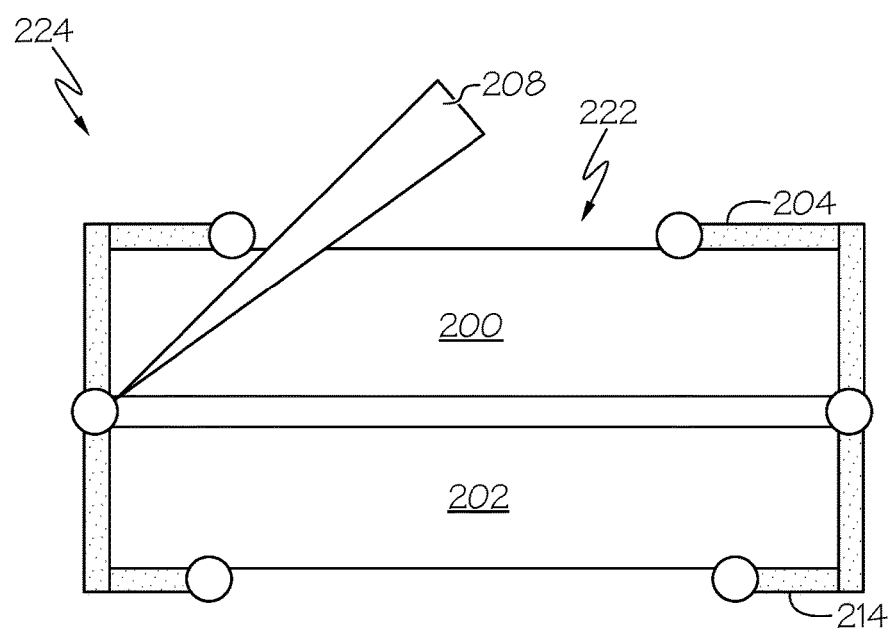
FIG. 9 schematically depicts another step of the laser bonding method, according to one or more embodiments shown and described herein.

Referring back to FIG. 1 and as shown in FIG. 9, the first metal foil 204 and the second metal foil 214 may be sealed together to produce a hermetically sealed package 224. In embodiments, the hermetically sealed package 224 is created by joining the first metal foil 204 and the second metal foil 214 to one another. In embodiments, the hermetically sealed package 224 may be created by joining the first metal foil 204 and the second metal foil 214 to one another and to an optional glass spacer (not depicted) positioned between the first glass substrate 200 and the second glass substrate 202. In embodiments, the hermetically sealed package 224 is created by joining the first metal foil 204 and the second metal foil 214 to an optional glass spacer (not depicted) positioned between the first glass substrate 200 and the second glass substrate 202. In embodiments, sealing the first metal foil 204 and the second metal foil 214 may utilize substantially similar or the same beam properties of laser beam 208 as the first welding step as described above with respect of FIG. 3. In embodiments, the hermetically sealed package may have a leak rate that is less than the test detectability of $1 \times 10^{-10}$ atm-cc/sec air as measured by MIL-STD-750E Test Method 1071.9.

Figure 10:
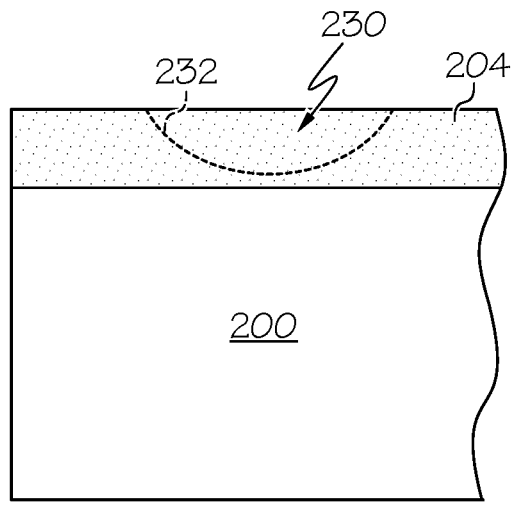
FIG. 10 schematically depicts a step of an alternative laser bonding method, according to one or more embodiments shown and described herein.
Figure 11:
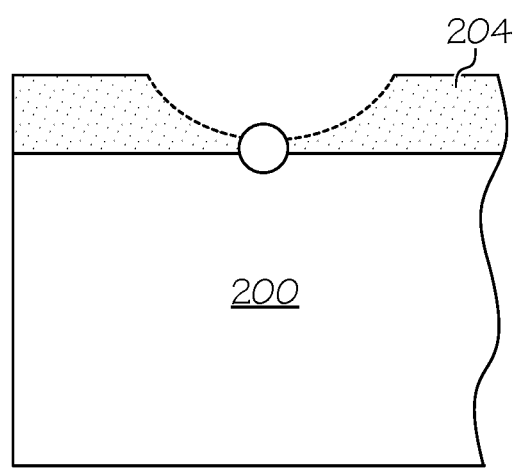
FIG. 11 schematically depicts another step of the alternative laser bonding method, according to one or more embodiments shown and described herein.

Referring now to FIGS. 10 and 11, an alternative process for laser bonding glass to metal foil may comprise mounting the first metal foil 204 on the first glass substrate 200. A laser beam may be used to remove a portion 230 of the first metal foil 204, such as by laser ablation, as indicated by dashed lines 232. Once the portion 230 is removed, then the laser beam may be used to bond the first metal foil 204 to the first glass substrate 200. Removal of a portion of the first metal foil 204 creates a region on the first metal foil 204 having reduced thickness which, in turn, may enable the utilization of lower energy lasers to bond the metal foil to the glass, thereby minimizing related thermal defects in regions proximate to the bond.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of laser bonding glass to metal foil, the method comprising:
    positioning a first surface of a first glass substrate adjacent to a first surface of a second glass substrate;
    contacting a second surface of the first glass substrate with a first surface of a first metal foil to create a first contact location between at least a portion of the second surface of the first glass substrate and the first surface of the first metal foil;
    conducting a first welding step by directing a laser beam on at least a portion of the first contact location to bond the first glass substrate to the first metal foil and form a first bond location;
    contacting a second surface of the second glass substrate with a first surface of a second metal foil to create a second contact location between at least a portion of the second surface of the second glass substrate and the first surface of the second metal foil; and
    conducting a second welding step by directing the laser beam on at least a portion of the second contact location to bond the second glass substrate to the second metal foil and form a second bond location,
    wherein the first metal foil and the second metal foil each have a thickness greater than or equal to 5 μm and less than or equal to 100 μm, and
    wherein the laser beam comprises a pulsed laser comprising:
        a pulse energy greater than or equal to 2.8 μJ and less than or equal to 1000 μJ; and
        a wavelength such that the first glass substrate and the second glass substrate are substantially transparent to the wavelength of the laser beam and the first metal foil and the second metal foil are substantially opaque to the wavelength of the laser beam.

2. The method of claim 1, wherein at least one of the first bond location and the second bond location have a maximum bond depth less than or equal to 20 μm.

3. The method of claim 1, wherein the first metal foil and the second metal foil are sealed to produce a hermetically sealed package.

4. The method of claim 1, wherein the pulsed laser has a wavelength greater than or equal 300 nm and less than or equal to 1100 nm.

5. The method of claim 1, wherein the pulsed laser is a nanosecond pulsed laser, a picosecond pulsed laser, or a femtosecond pulsed laser.

6. The method of claim 1, wherein the pulsed laser has a repetition rate greater than or equal to 5 kHz and less than or equal to 1 MHz.

7. The method of claim 1, wherein the pulsed laser has a spot size greater than or equal to 5 μm and less than or equal to 50 μm.

8. The method of claim 1, wherein the laser beam is directed at an oblique angle of incidence relative to the first glass substrate and the second glass substrate.

9. The method of claim 8, wherein the oblique angle of incidence is less than or equal to 30°.

10. The method of claim 8, wherein a lens is disposed optically upstream of both the first and second glass substrates such that the laser beam passes through the lens before passing through the first glass substrate and the second glass substrate.

11. The method of claim 1, wherein during the first welding step, the first glass substrate is disposed optically downstream of the second glass substrate such that the laser beam passes through the second glass substrate, then the first glass substrate, before being incident on the first contact location.

12. The method of claim 1, wherein during the second welding step, the second glass substrate is disposed optically downstream of the first glass substrate such that the laser beam passes through the first glass substrate, then the second glass substrate, before being incident on the second contact location.

13. The method of claim 1, wherein during the first welding step, the first metal foil is disposed optically upstream of the first glass substrate such that the laser beam contacts the first metal foil to bond the first metal foil to the first glass substrate.

14. The method of claim 13, wherein the laser beam removes a portion of the first metal foil prior to bonding the first metal foil to the first glass substrate.

15. The method of claim 1, wherein the first glass substrate and the second glass substrate comprise a refractive index greater than or equal to 1.5 and less than or equal to 2.4.

16. The method of claim 1, wherein the first glass substrate and the second glass substrate comprise a glass, a ceramic, or a glass-ceramic comprising borate glass, silicoborate glass, phosphate-based glass, silicon carbide glass, soda-lime silicate glass, aluminosilicate glass, alkali-aluminosilicate glass, borosilicate glass, alkali-borosilicate glass, aluminoborosilicate glass, alkali-alumino-borosilicate glass, alkali-aluminosilicate glass, or sapphire.

17. The method of claim 1, wherein at least one of the first metal foil and the second metal foil comprises aluminum, aluminium alloys, stainless steel, nickel, nickel alloys, silver, silver alloys, titanium, titanium alloys, tungsten, tungsten alloys, gold, gold alloys, copper, copper alloys, bronze, iron, or a combination thereof.

18. The method of claim 1, wherein at least one of the first metal foil and the second metal foil comprises a melting point less than or equal to 1600° C.

* * * * *